United States Patent
Bakewicz et al.

[15] 3,690,722
[45] Sept. 12, 1972

[54] RETRACTABLE CLOSURE

[72] Inventors: Frank J. Bakewicz, Grosse Pointe; Robert G. McGarvey, Troy, both of Mich.

[73] Assignee: General Motors Corporation, Detroit, Mich.

[22] Filed: April 21, 1971

[21] Appl. No.: 135,855

[52] U.S. Cl. ............................................296/137 R
[51] Int. Cl. .................................................B60j 7/00
[58] Field of Search ...296/137 R, 137 B, 137 E, 116, 296/117, 107

[56] References Cited
UNITED STATES PATENTS

| | | | |
|---|---|---|---|
| 3,348,877 | 10/1967 | Caramanna | 296/137 R |
| 3,476,437 | 11/1969 | Schroeder | 296/137 R |
| 3,021,174 | 2/1962 | Rund | 296/117 |

*Primary Examiner*—Benjamin Hersh
*Assistant Examiner*—Robert R. Song
*Attorney*—W. E. Finken and D. L. Ellis

[57] ABSTRACT

A retractable closure for a vehicle body having a rigid roof structure over only a portion of the passenger compartment, the closure including a frame member supported on the vehicle body for fore and aft bodily movement and for limited pivotal movement, a cloth cover attached to the rigid roof structure and to the frame member, a pair of telescopic struts attached to the frame member and pivotally supported on the vehicle body, a cam on the vehicle body and a follower on the strut. Movement of the frame member aft initiates telescopic collapse of the strut and folding of the cloth cover beneath the rigid roof structure. As the frame member approaches the fully retracted or open position the follower engages the cam which thereafter constrains the strut to pivot simultaneously with aft movement of the frame member, the strut, in turn, pivoting the frame member upward into juxtaposition with the underside of the rigid roof structure to maximize passenger headroom.

4 Claims, 12 Drawing Figures

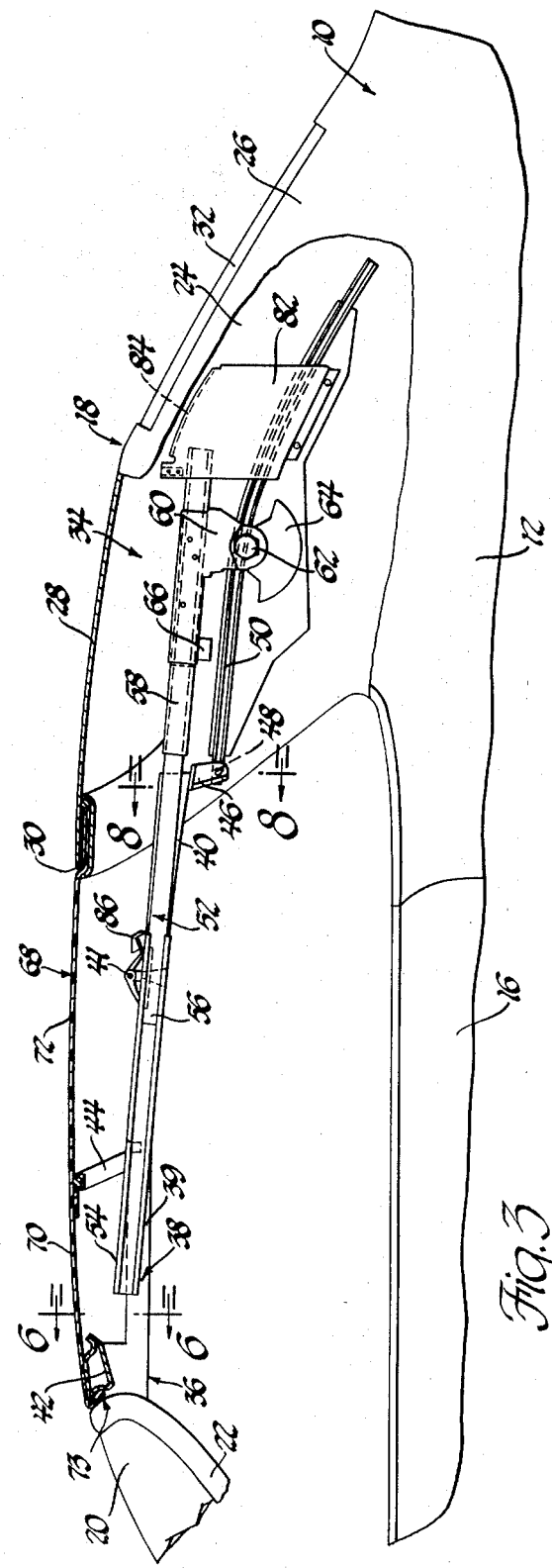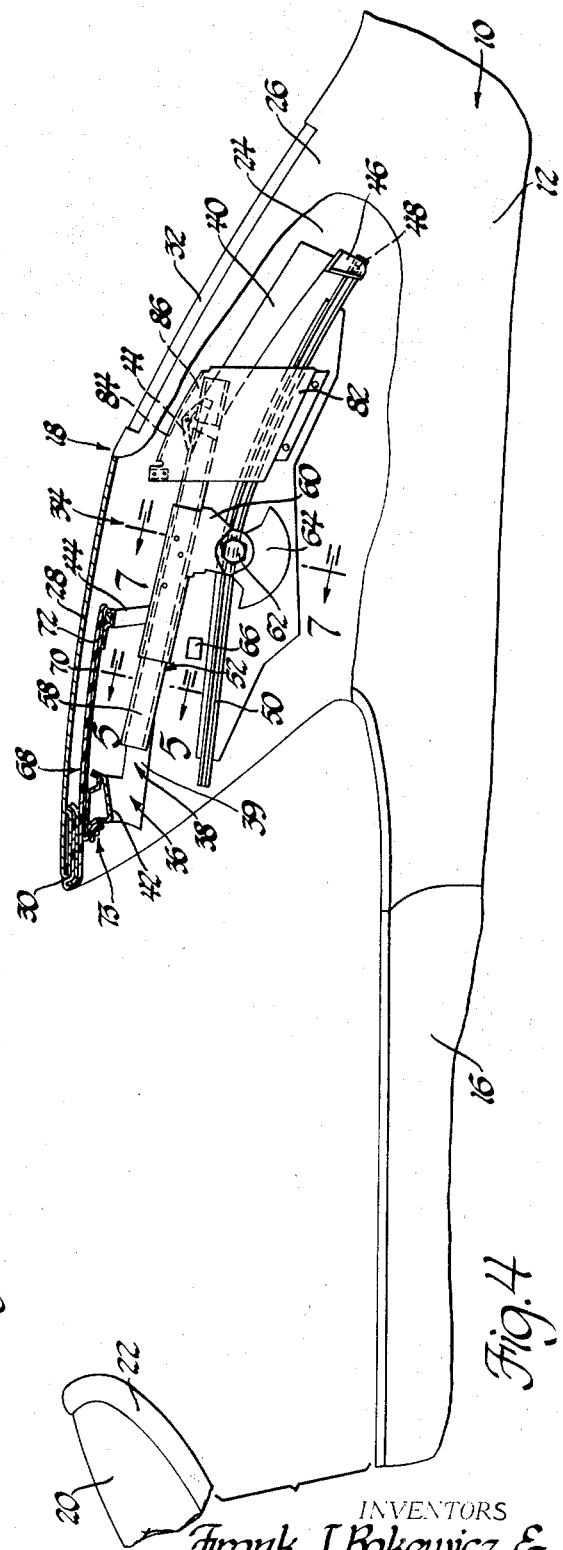

INVENTORS
Frank J. Bakewicz, &
BY Robert G. McGarvey
D. L. Ellis
ATTORNEY

PATENTED SEP 12 1972

INVENTORS
Frank J. Bakewicz, &
BY Robert G. McGarvey
D.L. Ellis
ATTORNEY

RETRACTABLE CLOSURE

This invention relates generally to vehicle bodies and in particular to a retractable closure means for a vehicle body having a roof structure extending over only a portion of the passenger compartment.

The half-convertible type automobile vehicle body, wherein a rigid roof structure extends over only a portion of the passenger compartment and a retractable closure is selectively operable to cover and uncover the remainder, represents an attempt to combine into one vehicle body the most desirable characteristics of the coupe style vehicle body and the sporty convertible style vehicle body. Accordingly, numerous retractable closure arrangements have been proposed and incorporate either rigid panels movable between open and closed positions or flexible covers mounted on movable frames. The latter type arrangements, while normally being less expensive than those incorporating rigid panels, have not always functioned satisfactorily because of the inherent problems associated with handling and efficiently stowing flexible covers. The copending application of Ted Stewart, Ser. No. 94,493 filed Dec. 2, 1970 and assigned to the assignee of this invention, discloses a retractable closure arrangement for a half-convertible vehicle body wherein a top supporting bow is pivotable relative to a movable top frame so as to maximize passenger headroom when the flexible cover is stowed. A retractable closure means according to this invention represents an alternative solution to the problem of efficiently stowing a flexible cloth cover.

The primary feature of this invention is that it provides a new and improved retractable closure means for a vehicle body having a passenger compartment, a windshield support forward of the passenger compartment, and a rigid roof structure extending over only a portion of the passenger compartment. Another feature of this invention is that it provides a retractable closure means including a frame member to which a cloth or flexible cover is attached, the frame member being bodily movable between an extended closed position and a retracted open position and pivotable relative to the vehicle body in the retracted position between a lowered position and a raised position wherein the frame member and cover are stowed in juxtaposition with the underside of the rigid roof structure. Still other features of this invention reside in the provision of guide means defining a path of motion for bodily movement of the rearward end of the frame member and supporting the latter for pivotal movement about a transverse axis and in the provision of telescopeable struts rigidly connected to the frame member and mounted on the vehicle body for pivotal movement about a fixed transverse axis of the latter, the struts supporting the forward end of the frame member during bodily movement between the extended and retracted positions and being operative to initiate pivotal movement of the frame member between the lowered and raised positions. A still further feature of this invention resides in the provision of cam and follower means on the vehicle body and on the struts, the follower means engaging the cam means during bodily movement of the frame member to the retracted position and automatically pivoting the struts to a position corresponding to the raised position of the frame member.

These and other features of this invention will be readily apparent from the following specification and from the drawings wherein:

FIG. 3 is a partially broken away view of a portion of FIG. 1;

FIG. 4 is a partially broken away view of a portion of FIG. 2;

Figure 1:
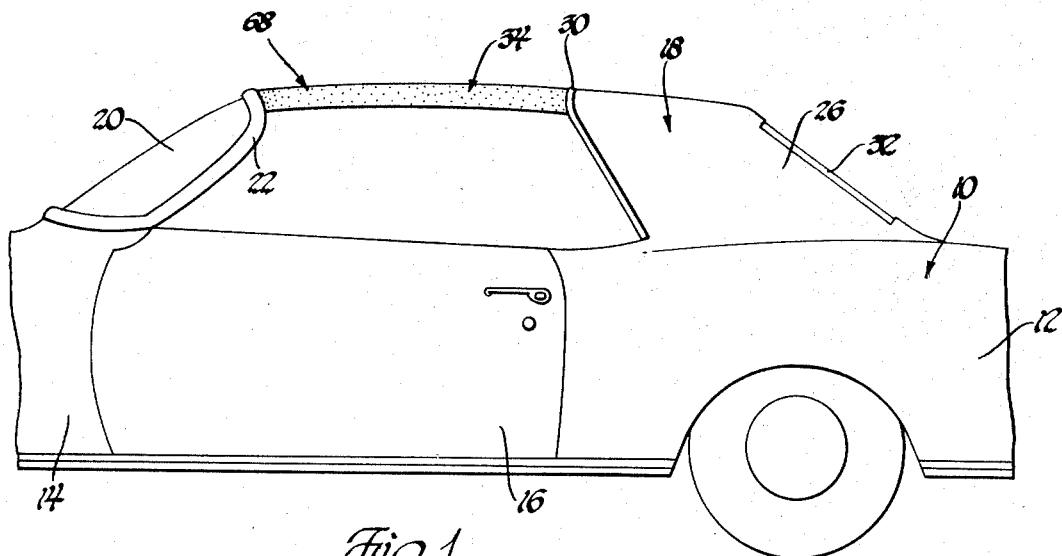
FIG. 1 is a fragmentary side elevational view of a half-convertible type automobile vehicle body having a retractable closure means according to this invention, the closure means being shown in a closed position.
Figure 2:
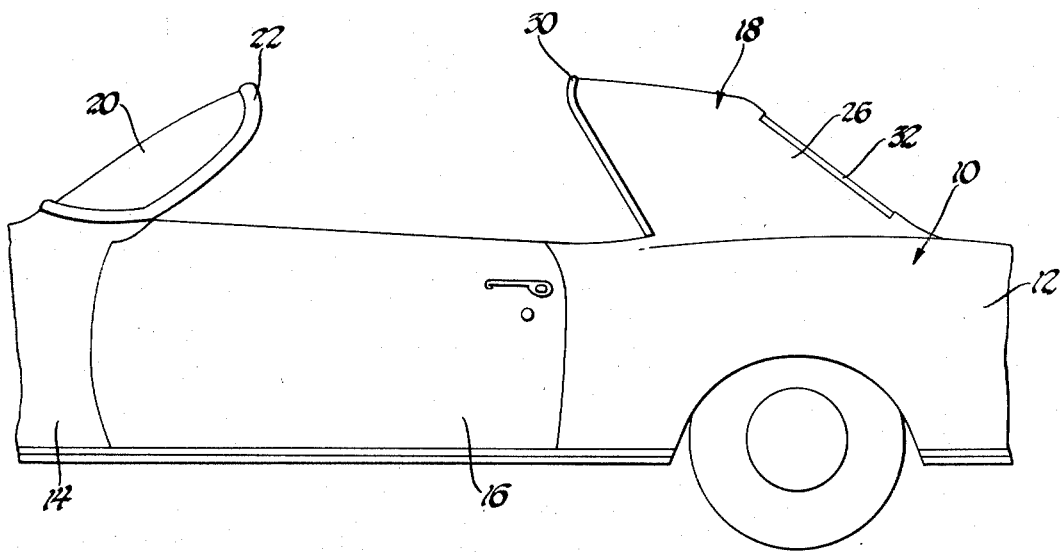
FIG. 2 is similar to FIG. 1 but showing the closure means in an open position.

Referring now to FIGS. 1 and 2 of the drawings, there is shown a half-convertible type automobile vehicle body designated generally 10 including a left rear quarter panel structure 12, a left front fender structure 14 and a vertically hinged door 16 situated between the quarter panel and front fender. The door 16 and the quarter panel structure 12, in combination with a corresponding door and quarter panel structure, not shown, on the opposite side of the vehicle body, define a passenger compartment over the rear portion of which projects a fixed roof structure designated generally 18 integral with the quarter panel structures of the vehicle body. The forward portion of the passenger compartment above the vehicle belt line is bounded by a windshield 20 sealingly mounted within a rigid windshield support structure 22.

As best seen in FIGS. 3 and 4, the fixed roof structure 18 includes a right sail panel 24 integral with and projecting upward from the right quarter panel structure, not shown, and a left sail panel 26 integral with and projecting upward from left quarter panel structure 12, the sail panels being rigidly joined together by a roof panel 28 extending transversely over the rear portion of the passenger compartment. The roof panel 28 has a leading edge 30 spaced rearwardly from the windshield support 22 and cooperates with the sail panels in sealingly supporting a fixed rear window 32. The space between the leading edge 30 and the windshield support 22 is selectively closable by a retractable closure means according to this invention designated generally 34.

Figure 5:
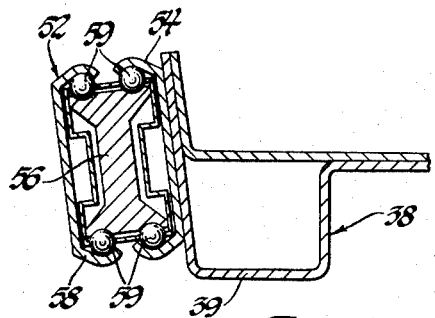
FIG. 5 is an enlarged sectional view taken generally along the plane indicated by lines 5—5 in FIG. 4.

Referring now to FIGS. 3, 4 and 5, the retractable closure means 34 includes a frame member designated generally 36 having a pair of longitudinally extending side rails, only right side rail 38 being shown. Each side rail is articulated and, referring to side rail 38, includes a front half 39 and a rear half 40 connected by a hinge 41. The frame member further includes a transverse header 42 rigidly attached to the forward end of each side rail front half and a transverse support bow 44 spaced rearwardly from the header and also rigidly attached to each side rail front half.

A roller support tab 46 is rigidly attached to the right side rail 38 at the rearward end of the rear half thereof and rotatably supports a roller follower 48. A corresponding tab, not shown, is similarly affixed to the left side rail and the roller follower thereon, in combination with roller follower 48, defines a transverse axis of the frame member 36. A curved right side cam channel 50 is rigidly affixed to right sail panel 24 and a corresponding cam channel, not shown, is rigidly affixed to left sail panel 26 in parallel relation to cam channel 50. The roller followers on the support tabs are guidingly received in corresponding ones of the cam channels and cooperate with the latter in defining a path of motion for the rearward end of the frame member 36 while permitting the latter to pivot relative to the vehicle body about the axis defined by the roller followers.

As best seen in FIGS. 3, 4, 5 and 7, the retractable closure means 34 further includes a pair of identical telescopeable struts, only right strut 52 being shown, and each strut includes an outer section 54, a center section 56 and an inner section 58. A plurality of antifriction spheres 59 support the center section 56 on the inner section 58 and the outer section 54 on the center section for relative axial movement only. Inner section 58 of the right strut 52 has a bracket 60 rigidly affixed thereto, as by welding, and the bracket is pivotally supported on a stud 62 rigidly affixed to a support plate 64 projecting inwardly from the right sail panel 24. The left side rail, not shown, is similarly supported on the left sail panel structure 26 and the stud 62, in combination with the corresponding stud on the opposite side, defines a fixed transverse axis of the vehicle body about which the struts are pivotable. As seen best in FIG. 5, the outer section 54 of the right strut 52 is rigidly affixed to the inner side of the front half 39 of the right side rail 38, the left side strut being similarly affixed to the left side rail. A pair of fixed stops rigidly supported on the right and left sail panel structures cooperate with the corresponding strut to limit the counterclockwise pivotal movement, FIGS. 3 and 4, of the latter, only fixed stop 66 on right sail panel structure 24 being shown, so that when the struts rest on the fixed stops each functions as a telescopically collapsible cantilever beam.

The struts cooperate with the cam channels and roller followers to support the frame member 36 on the vehicle body for fore and aft bodily movement between an extended position, FIG. 3, wherein the side rails span the distance between the fixed roof structure and the windshield support and the header 42 engages the windshield support, and a retracted position, FIG. 4, wherein both the header 42 and the transverse bow 44 underlie the roof panel 28, and for pivotal movement generally about the axis defined by the roller followers between a lowered position, not shown, and a raised position, FIG. 4, wherein the header 42 is juxtaposed with the underside of roof panel 28. The curvature of the cam channels is dependent upon the configuration of the fixed roof structure and the articulation provided by hinge 41 functions to accommodate such curvature. It will, of course, be apparent that if sufficient space is available the side rails need not be articulated.

Figure 6:
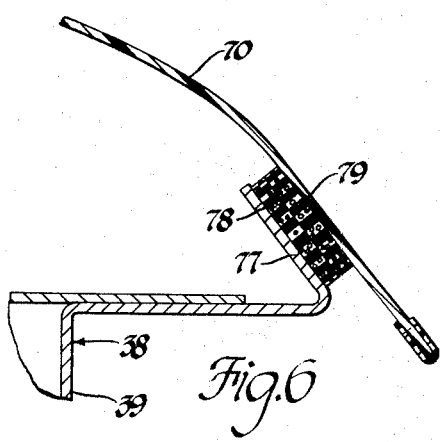
FIG. 6 is an enlarged sectional view taken generally along the plane indicated by lines 6—6 in FIG. 3.
Figure 7:
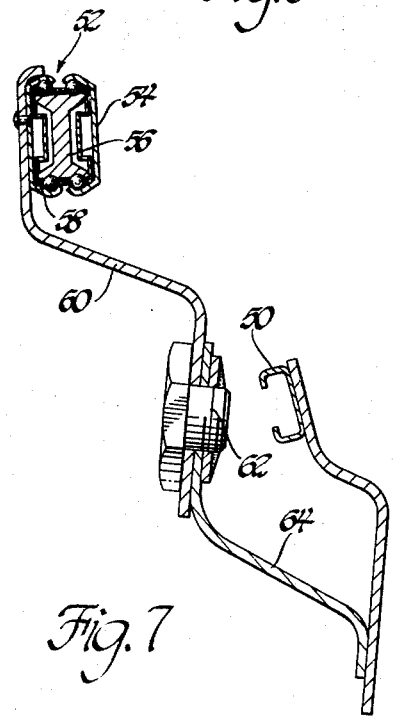
FIG. 7 is an enlarged sectional view taken generally along the plane indicated by lines 7—7 in FIG. 4.
Figure 8:
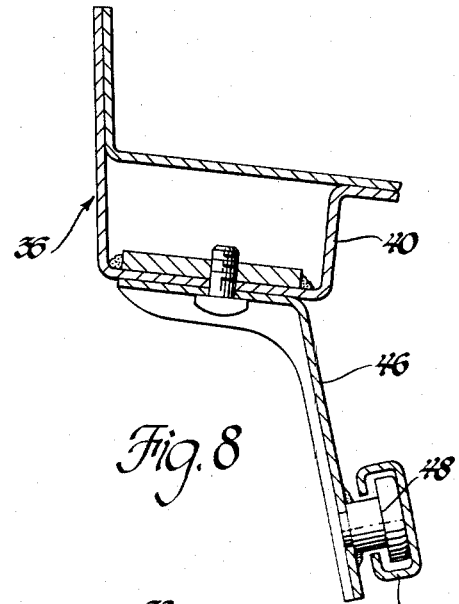
FIG. 8 is an enlarged sectional view taken generally along the plane indicated by lines 8—8 in FIG. 3.
Figure 9:
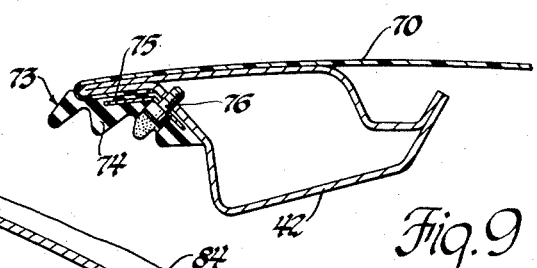
FIG 9 is an enlarged view of a portion of FIG. 3 showing the header windlace structure.

As seen best in FIGS. 1 through 6, the frame member 36 supports a cover assembly designated generally 68 operative in the extended position of the frame member to close the space between the leading edge 30 of the roof panel 28 and the windshield support 22. More particularly, the cover assembly 68 includes a front section 70 and a rear section 72, the two sections, in the embodiment shown, being part of a single piece of flexible cloth. As will become apparent hereinafter, however, it is necessary only that the rear section 72 be flexible. The rearward edge of the rear section 72 is attached to the roof panel 28 of the fixed roof structure generally along the entire length of the leading edge 30. As seen best in FIG. 9, the forward edge of the front section 70 is clamped to the header 42 generally along the entire length thereof by a windlace structure 73 including a rubber seal 74 reinforced by a metal strip 75 and secured to the header by a plurality of threaded fasteners 76. At the junction between the front section 70 and the rear section 72 the cover assembly is fastened to the bow 44 generally along the entire length of the bow. Referring particularly to FIG. 6, each side rail has an outwardly extending upturned flange adapted to receive a pressure sensitive releasable seal means, only flange 77 having a seal means 78 thereon being shown in FIG. 6. A similar seal means 79 is attached to each longitudinal edge of the cover assembly so that when the frame member 36 assumes the extended position the seal means on the cover assembly and on the side rails meet and form a relatively weather resistant seal.

As seen best in FIG. 3, when the frame member with the cover assembly attached thereto assumes the extended position, the front and rear sections 70 and 72 of the cover assembly stretch between the leading edge 30 and the windshield support structure 22 to shield the passenger compartment from the elements. As the frame member 36 is manually bodily moved rearward or aft toward the retracted position thereof, FIG. 4, the transverse bow 44 passes beneath the leading edge 30 of the roof panel 28. Simultaneously with such movement the seal means on the longitudinal side edges of the rear section 72 of the cover assembly are peeled away from the seal means on the corresponding side rail of the frame member and the rear section is efficiently folded over the front section 70, the longitudinal side edges of which section do not separate from the frame member. Conversely, when the frame member is manually bodily moved forward from the retracted to the extended position, the sequence of movement is reversed and the rear section 72 is efficiently unfolded to the position thereof shown in FIG. 3, during which unfolding the seal means 78 and 79 are pressed into contact to form a weather resistant seal.

When the frame member is in the retracted position, the header 42 lies rearward of leading edge 30 and substantially below the fixed roof 28 and would, in the absence of counter measures, significantly impair passenger headroom. Cam and follower means are provided, however, to automatically pivot the frame member from the lowered to the raised position to maximize passenger headroom. As seen best in FIG. 10, the cam and follower means include a plate member 82 rigidly supported on right sail panel 24, the plate member having an integral camming flange 84. Cooperating with the camming flange 84 is a leaf spring cam follower 86 rigidly attached to the rear end of outer section 54 of the right strut 52. It will be understood, of course, that a structurally and functionally identical cam and follower means, not shown, is provided on the left sail panel and on the left strut.

Figure 10:
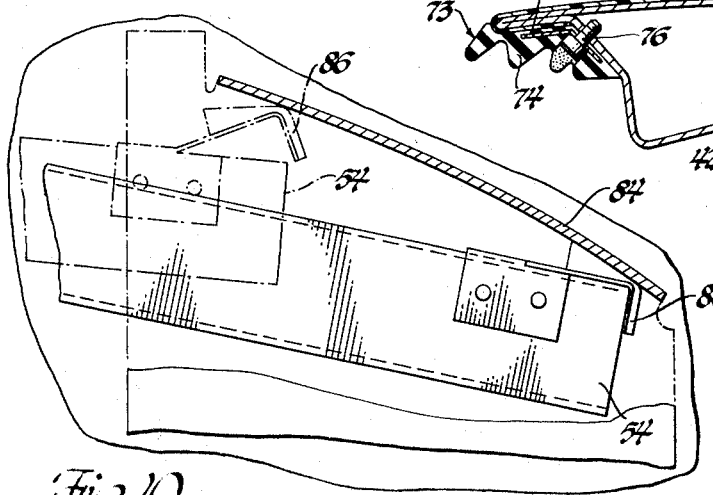
FIG. 10 is an enlarged view of a portion of FIG. 4 showing the cam and follower means.

Referring now to FIGS. 3, 4 and 10, as the frame member 36 is bodily moved from the extended to the retracted position, the strut 52 collapses in telescopic fashion with the outer section 54 moving rearward. As the frame member approaches the retracted position, the rearward end of outer section 54 of the strut passes above the fixed transverse axis defined by stud 62 and the leaf spring follower 86 engages the forward end of camming flange 84 on the plate member 82 as shown in broken lines in FIG. 10. Continued rearward movement of the frame member to the retracted position initiates sliding movement of the follower 86 along the camming flange 84, the latter constraining the rearward end of the outer section 54 to move downward to thereby cause the entire right strut 52 to pivot clockwise, FIG. 4, about the fixed transverse axis of the vehicle body. Such pivotal movement of the strut initiates corresponding clockwise pivotal movement of the entire frame member about the axis thereof defined by the roller followers thereon from the lowered to the raised position, FIG. 4, wherein the header 42 is juxtaposed with the underside of roof panel 28. When it is desired to close the opening between the leading edge 30 and the windshield support 22, the initial forward movement of the frame member 36 is accompanied simultaneously by sliding movement of the follower 86 along camming flange 84 in the reverse direction so that the frame member is automatically moved from the raised to the lowered position to accommodate unfolding movement of the cover assembly.

Figure 11:
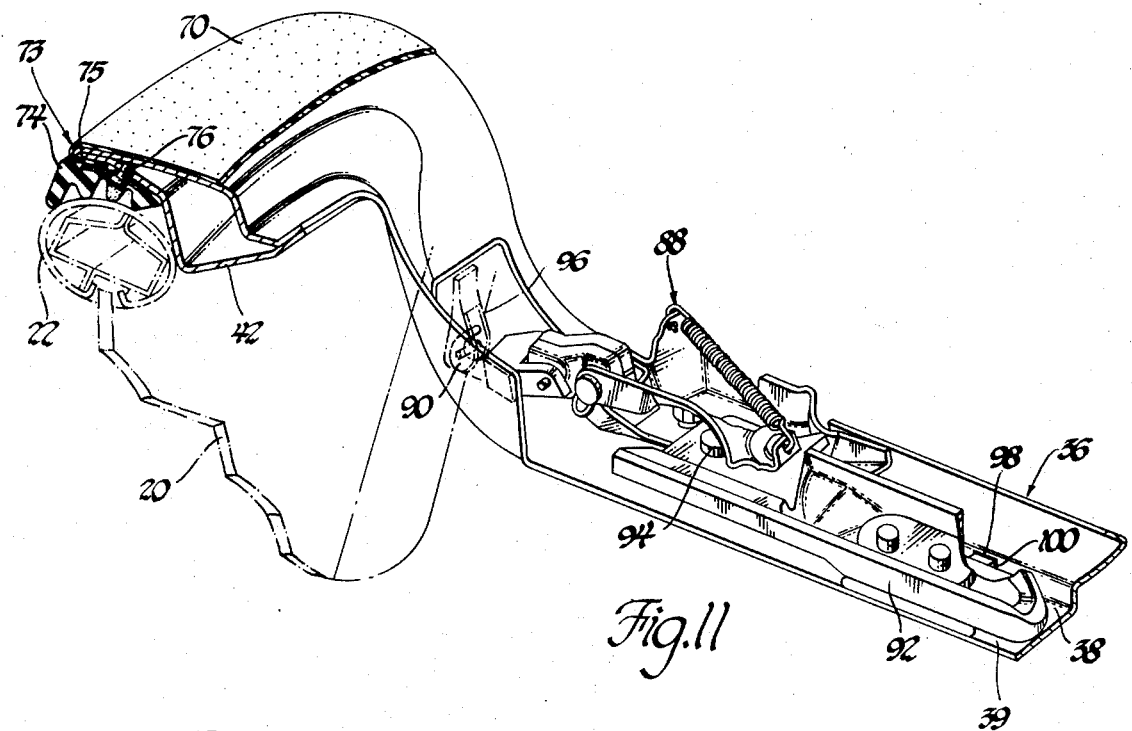
FIG. 11 is an enlarged perspective view of the frame member latch structure showing the latter in a latched condition.
Figure 12:
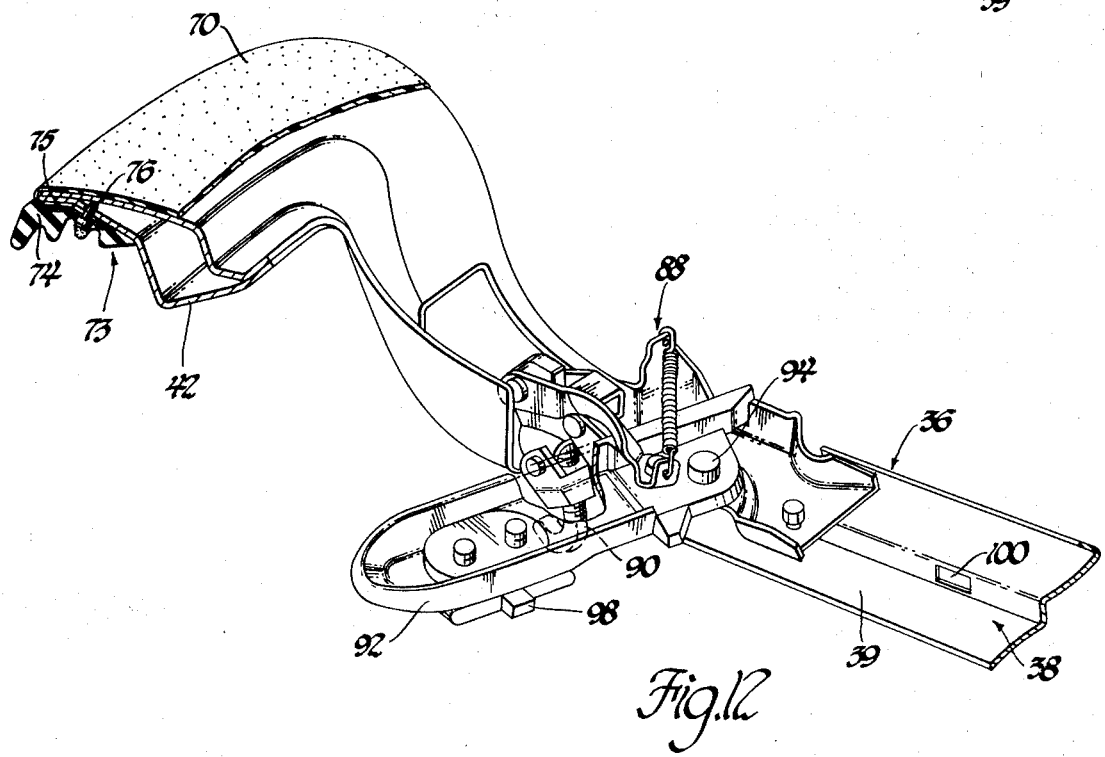
FIG. 12 is similar to FIG. 11 but showing the frame member latch structure in an unlatched condition.

Referring to FIGS. 11 and 12, the frame member 36 is securely maintained in the extended position by a header latch assembly designated generally 88 including a releasable hook 90 actuated by a handle 92 pivotable about a stud 94, the hook 90 engaging a striker 96 rigidly attached to the windshield support 22. The latch assembly 88 is generally identical in structure and operation to the header latch assembly disclosed in U.S. Pat. No. 3,216,763, issued to Raymond G. Heincelman on Nov. 9, 1965 and assigned to the assignee of this invention, except that latch assembly 88 includes means for maintaining the closure means 34 in the open condition against inertial forces generated during deceleration of the vehicle. More particularly, the handle 92 of the latch assembly is equipped with a laterally extending rigid tab 98 which tab projects through an aperture 100 in the right side rail 38 of the frame member when the handle is in the latched position shown in FIG. 11 corresponding to the latched condition of the latch assembly. A similar aperture, not shown, is fabricated in the appropriate sheet metal of the right sail panel structure adjacent cam channel 50. When the frame member achieves the retracted position and, accordingly, is automatically pivoted from the lowered to the raised position, the aforementioned apertures are brought into register and the handle 92 is moved from an unlatched position, FIG. 12, to the latched position, FIG. 11, causing the tab 98 to project through aperture 100 and into the registering aperture in the sail panel structure. The tap 98 is thus captured in the fixed aperture so that as long as the handle 92 remains in the latched position, forward bodily movement of the frame member is restricted.

Having thus described the invention, what is claimed is:

1. In a vehicle body having a passenger compartment, a windshield support forward of said passenger compartment, and a fixed roof structure remote from said windshield support extending over a portion of said passenger compartment and defining a leading edge spaced rearwardly from said windshield support, a retractable closure means comprising, frame means defining a transverse header, means supporting said header on said vehicle body for bodily movement between an extended position engaging said windshield support and a retracted position situated beneath said fixed roof structure and for movement between a lowered position and a raised position in a direction generally perpendicular to the path of said bodily movement, a cover assembly, means attaching said cover assembly to said frame means along said header, means attaching said cover assembly to said fixed roof structure along said leading edge of the latter so that in the extended position of said header said cover assembly stretches between said windshield support and said fixed roof structure, folding means operative in response to movement of said header from the extended to the retracted position thereof to fold said cover assembly for storage below said fixed roof structure, and cam means responsive to bodily movement of said header between the extended and the retracted positions thereof for moving said header between the raised and the lowered positions thereof.

2. In a vehicle body having a passenger compartment, a windshield support forward of said passenger compartment, and a fixed roof structure remote from said windshield support extending over a portion of said passenger compartment and defining a leading edge spaced rearwardly from said windshield support, a retractable closure means comprising, a frame member having a pair of side rails interconnected at one end by a header, means supporting said frame member on said vehicle body for fore and aft bodily movement and for pivotal movement about an axis of said frame member extending generally transversely of said vehicle body so that said header is bodily movable fore and aft between an extended position wherein said header engages said windshield support and said side rails each extend longitudinally of said vehicle body between said windshield support and said fixed roof structure and a retracted position wherein said header is situated below said fixed roof structure and so that said header is movable in a direction generally perpendicular to the path of said fore and aft movement between a raised position and a lowered position, a cover assembly, means attaching said cover assembly to said frame member along said header, means attaching said cover assembly to said fixed roof structure along said leading edge of the latter so that in the extended position of said header said cover assembly stretches between said windshield support and said fixed roof structure, folding means operative in response to movement of said header from the extended to the retracted position thereof to fold said cover assembly for storage below said fixed roof structure, and cam means responsive to bodily movement of said header between the extended and the retracted positions thereof for moving said header between the raised and the lowered positions thereof.

3. In a vehicle body having a passenger compartment, a windshield support forward of said passenger compartment, and a fixed roof structure remote from said windshield support extending over a portion of said passenger compartment and defining a leading edge spaced rearwardly from said windshield support, a retractable closure means comprising, a frame member having a transverse header and a transverse bow spaced from said header, means supporting said frame member on said vehicle body for bodily movement between an extended position wherein said header engages said windshield support and a retracted position wherein said header and said bow are situated beneath said fixed roof structure and for pivotal movement about an axis of said frame member extending generally transversely of said vehicle body between a lowered position and a raised position wherein said header is juxtaposed with the underside of said fixed roof structure, a cover assembly including a front section and a flexible rear section joined to said front section, means attaching said front section to said frame member along said header, means attaching said rear section to said fixed roof structure along said leading edge of the latter, means attaching said cover assembly at the junction between said front and said rear sections to said frame member along said transverse bow so that said cover assembly stretches between said windshield support and said leading edge in the extended position of said frame member and is folded under said fixed roof structure in the retracted position of said frame member, and cam means responsive to bodily movement of said frame member for synchronizing pivotal movement of said frame member from the lowered to the raised position thereof with the final stages of bodily movement thereof to the retracted position and from the raised to the lowered position with the initial stages of bodily movement of the frame member from the retracted toward the extended position.

4. In a vehicle body having a passenger compartment, a windshield support forward of said passenger compartment, and a fixed roof structure remote from said windshield support extending over a portion of said passenger compartment and defining a leading edge spaced rearwardly from said windshield support, a retractable closure means comprising, a frame member including a pair of side rails interconnected at their forward ends by a transverse header and intermediate their forward and rearward ends by a transverse bow, a pair of cam channels, means rigidly supporting each of said cam channels on said fixed roof structure on opposite sides of said vehicle body and in parallel relation, a pair of roller followers, means supporting each of said roller followers on a respective one of said side rails adjacent the rearward ends of the latter, said roller followers being engageable on said cam channels and movable in a path defined thereby while supporting said frame member on said vehicle body for pivotal movement about the axis of rotation of said roller followers extending generally transversely of said vehicle body, a pair of telescopeable struts, means supporting said struts on opposite sides of said vehicle body for pivotal movement about a fixed transverse axis of the latter, means rigidly attaching a distal end of each of said struts to a corresponding one of said side rails intermediate the ends of the latter, stop means on said vehicle body engageable on each of said struts and operable to limit pivotal movement of the latter in one direction, said struts and said follower means supporting said frame member on said vehicle body for fore and aft bodily movement between an extended position wherein said header engages said windshield support and a retracted position wherein said header and said bow are situated beneath said roof structure and for pivotal movement about said roller follower axis between a lowered position and a raised position wherein said header is juxtaposed with the underside of said fixed roof structure, a cover assembly including a front section and a flexible rear section, means attaching said front section to said frame member along said header, means attaching said rear section to said fixed roof structure along said leading edge, means attaching said cover assembly at the junction said front and said rear sections to said frame member along said transverse bow so that said cover assembly stretches between said windshield support and said leading edge in the extended position of said frame member and is folded under said fixed roof structure in the retracted position of said frame member, a cam guide, means rigidly supporting said cam guide on said fixed roof structure, a cam follower, and means rigidly supporting said cam follower on one of said struts for fore and aft bodily movement during telescopic collapse of said one strut, said cam follower being engageable on said cam guide in response to bodily movement of said frame member to the retracted position thereof and said cam guide thereafter being operative to pivot said strut about said fixed transverse axis simultaneously with rearward bodily movement of said frame member so that the latter is automatically pivoted to the raised position during the final stages of bodily movement to the retracted position and automatically pivoted to the lowered position during the initial stages of bodily movement from the retracted position toward the extended position.

* * * * *